Patented Mar. 10, 1925.

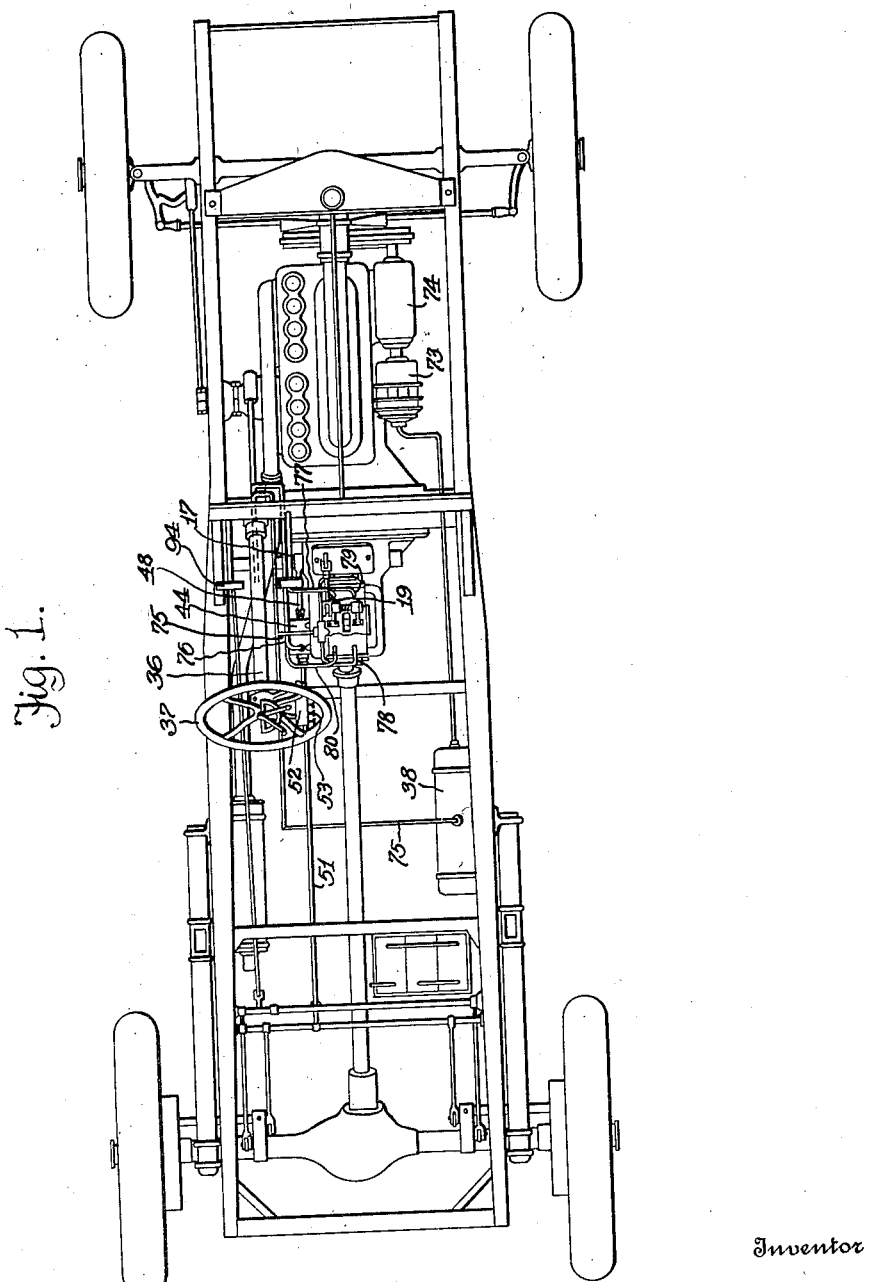

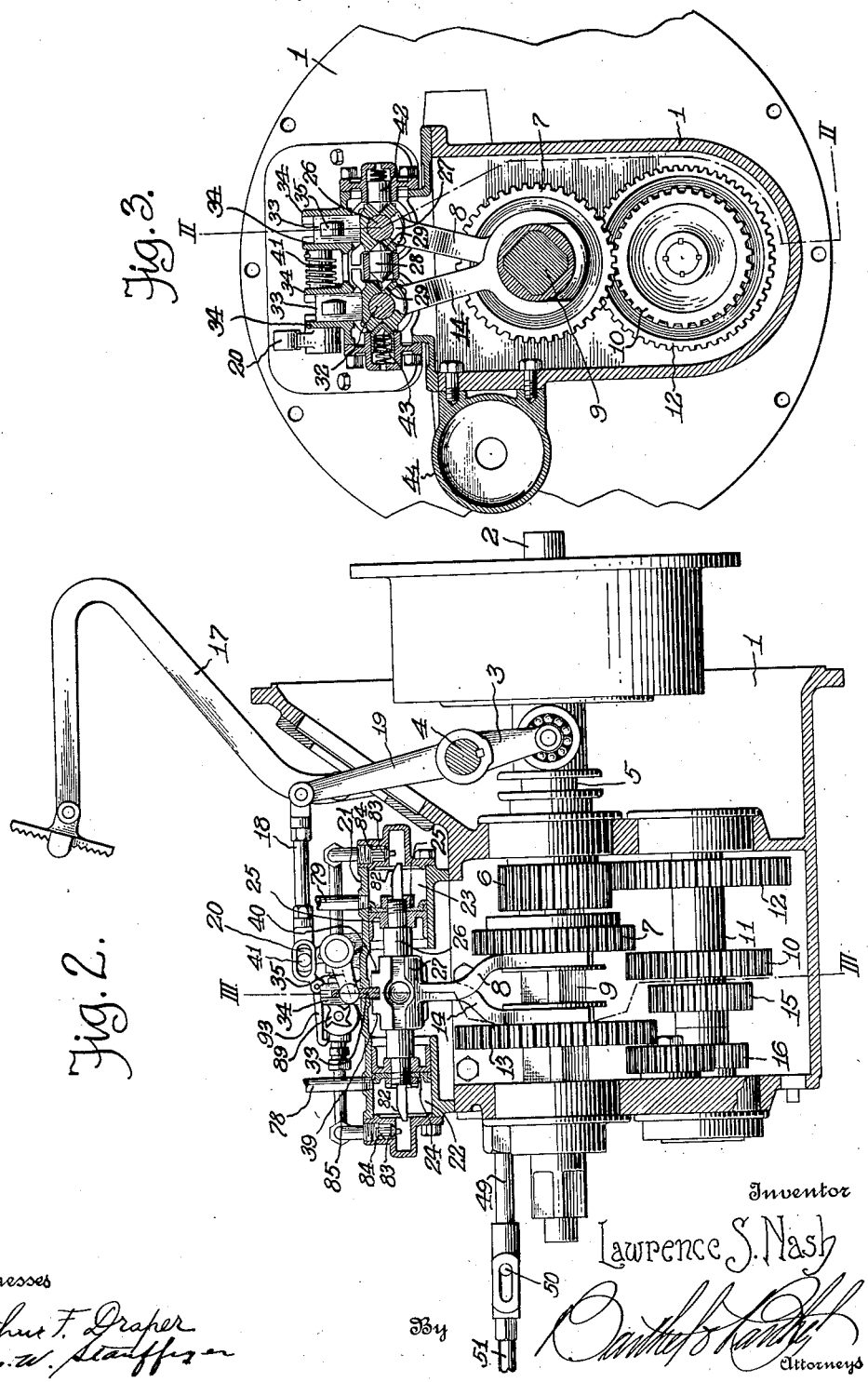

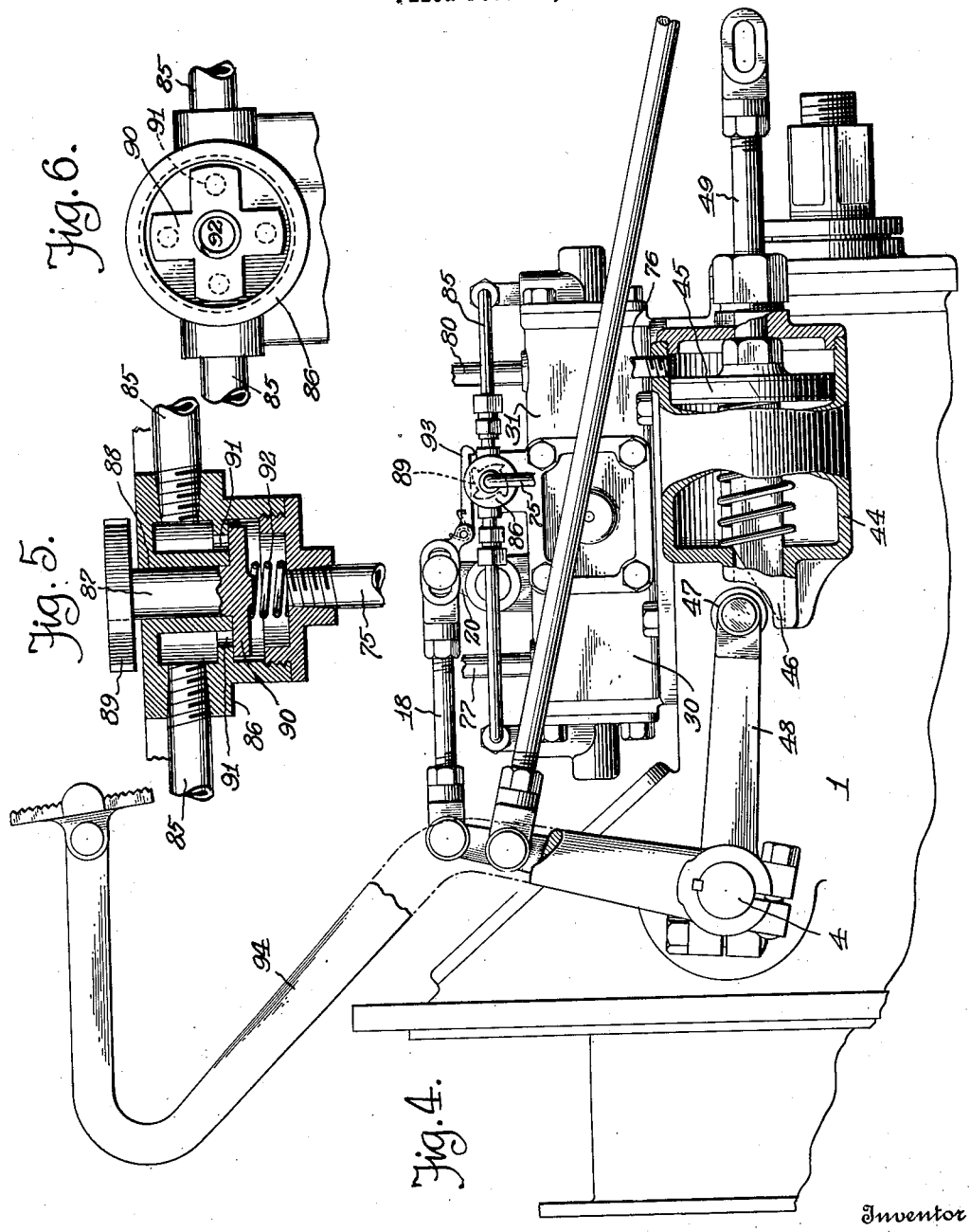

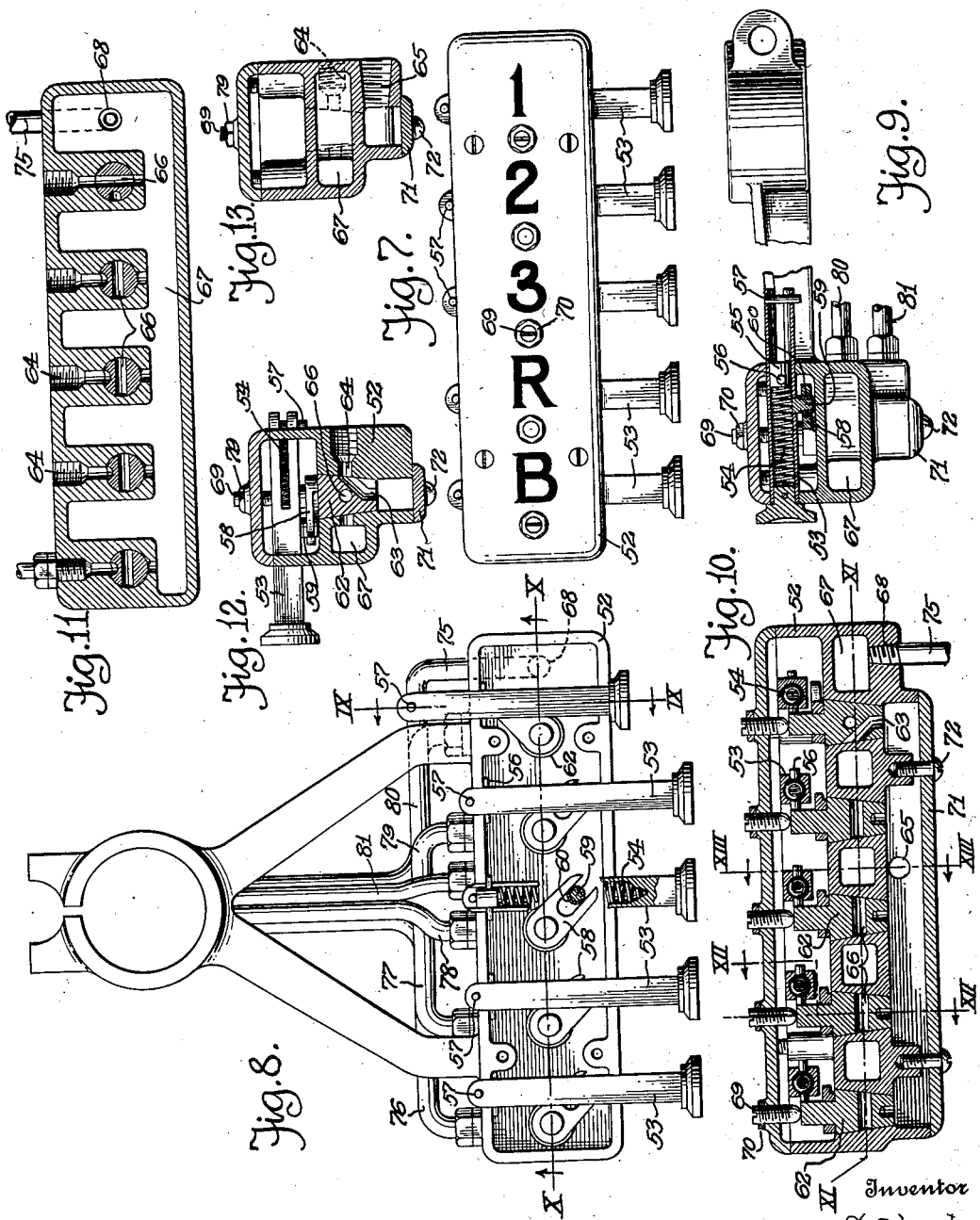

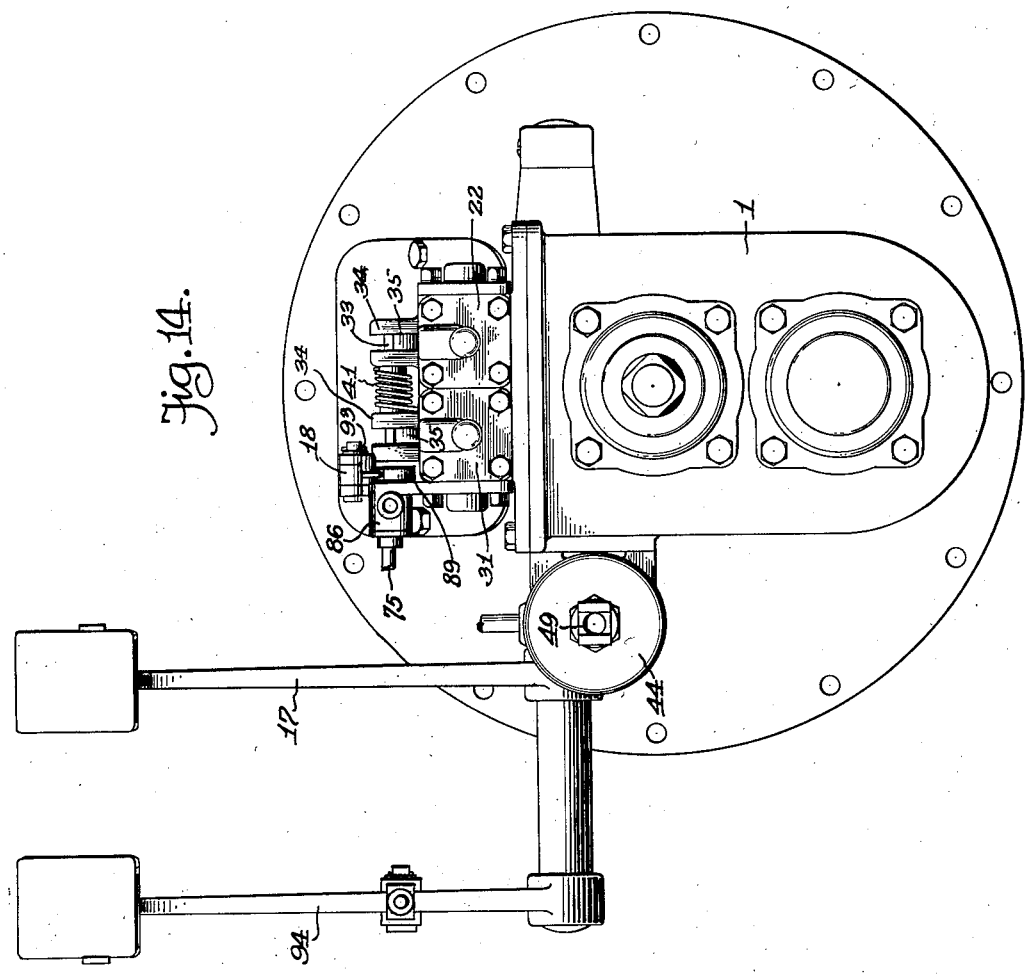

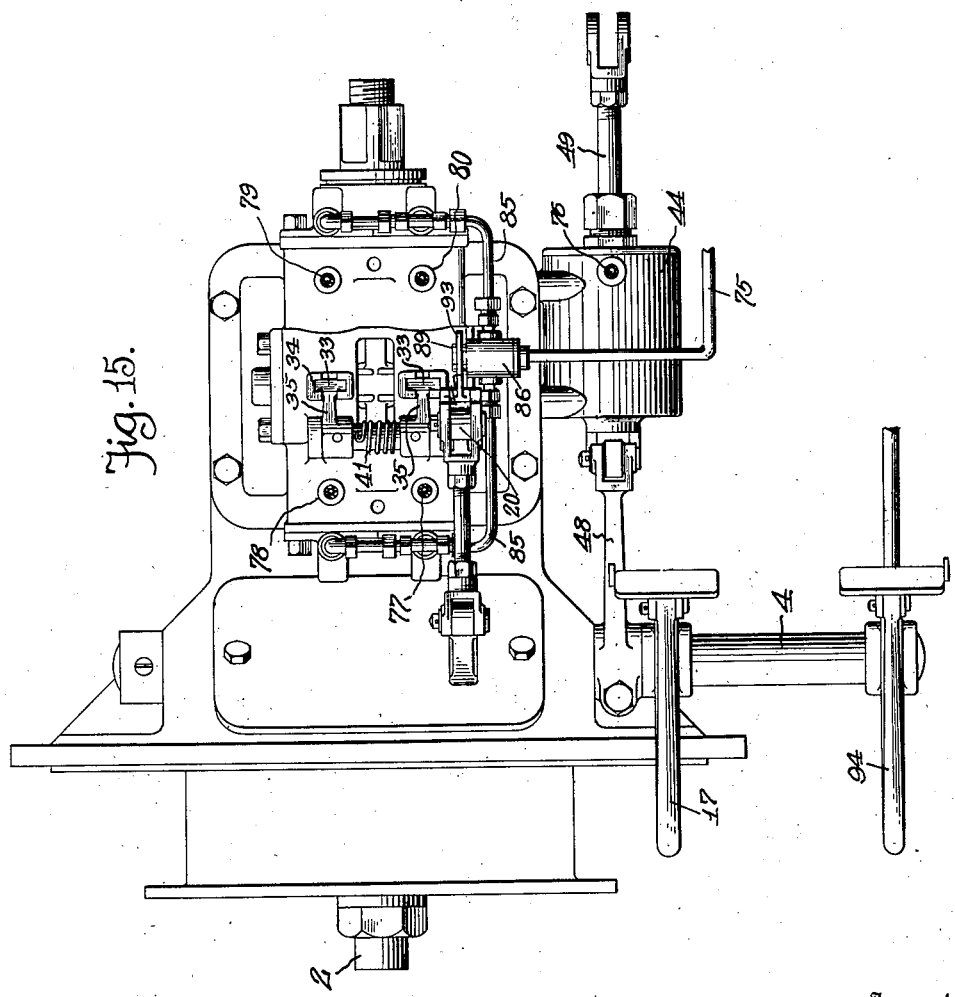

1,529,369

UNITED STATES PATENT OFFICE.

LAWRENCE S. NASH, OF DETROIT, MICHIGAN, ASSIGNOR OF ONE-THIRD TO CHARLES BRUSHABER AND ONE-THIRD TO WILLIAM L. JANUARY, BOTH OF DETROIT, MICHIGAN.

PNEUMATIC CONTROL FOR AUTOMOBILES.

Application filed December 20, 1920. Serial No. 431,883.

*To all whom it may concern:*

Be it known that I, LAWRENCE S. NASH, a citizen of the United States of America, residing at Detroit, in the county of Wayne and State of Michigan, have invented certain new and useful Improvements in Pneumatic Controls for Automobiles, of which the following is a specification, reference being had therein to the accompanying drawings.

This invention relates to pneumatic controlling means for the change speed and reversing mechanism as well as the brakes of an automobile. It has for its object an arrangement whereby the operator may readily make such gear shifts as he desires without losing control of the steering wheel and without any appreciable effort on his part.

Referring to the drawings,

Figure 1 is a plan view of an automobile chassis equipped with mechanism that embodies features of the invention;

Fig. 2 is a view partially in side elevation and partially in section, taken on the line II—II of Fig. 3, of a type of change speed mechanism equipped with the controlling means;

Fig. 3 is a view in cross section taken on the line III—III of Fig. 2;

Fig. 4 is a view in elevation of such change speed mechanism partially broken away and in section, on the other side of the casing from the view shown in Fig. 2;

Fig. 5 is a section taken horizontally through the neutralizing valve;

Fig. 6 is an end elevation of the neutralizing valve with the inlet pipe and plug removed;

Fig. 7 is a view in detail of one form of selective controlling valve;

Fig. 8 is a plan view of the valve and connecting bracket, with the top of the casing removed, partially shown in section and with one member in open position;

Fig. 9 is a view in section taken on or about line IX—IX of Fig. 8;

Fig. 10 is a view taken on or about line X—X of Fig. 8;

Fig. 11 is a view in longitudinal section taken on or about line XI—XI of Fig. 10;

Fig. 12 is a view taken on or about line XII—XII of Fig. 10;

Fig. 13 is a view in section taken on or about line XIII—XIII of Fig. 10; and

Fig. 14 is a rear end view; and

Fig. 15 a plan view respectively of the parts shown in Figs. 2 and 4.

Referring to the drawings, and to a type of controlling mechanism that is more particularly arranged for use in connection with a change speed and reversing mechanism of the slide-gear type, a casing 1 has a clutch case within which a clutch (not shown) is arranged to connect a drive shaft 2 with the motor of a car through the manipulation of a yoke 3 controlled by a rock shaft 4 or through other suitable means. A main driving gear 6 on the shaft 5 is internally arranged to couple non-rotatably with a slide pinion 7 that is controlled by a yoke 8 for longitudinal reciprocation on a squared or splined follower shaft 9 in the usual manner. The pinion 7, if disconnected from the interlocking arrangement of the drive gear 6 by a movement along the shaft 9, meshes with a forward pinion 10 on a countershaft 11 that is operated by a drive pinion 12 always in mesh with the gear 6. Similarly an intermediate and reverse pinion 13 that is reciprocable on the shaft 9 under the influence of a yoke 14 may be thrown into mesh with a companion pinion 15 on the countershaft 11 or with a reverse train 16.

A foot pedal lever 17 normally turns the rock shaft 4 to release the clutch through the medium of the yoke 3. A longitudinally slotted link 18 is pivoted at one end to the arm 19 and loosely connected at the other end through a longitudinal slot and pin with a bell crank lever 20.

A cylinder casing 21 that is conveniently secured on the main casing 1 of the gear mechanism has a pair of alined cylinders 22 and 23 with oppositely disposed pistons 24 and 25 connected by a piston rod 26. The head 27 of the yoke 8 is secured on this piston rod.

The yoke 14 is similarly connected to a piston rod that is shifted by a pair of pistons in alined cylinders 30 and 31 which are formed integrally with or connected in spaced relation to the cylinders 22 and 23. The latter piston rod, indicated at 32 of Fig. 3, together with the companion piston rod 26, are positively locked in the neutral position by means of latch plates 33 that are shiftable in guideways formed in upright bosses 34 of the cylinder casing under the influence of the lower arm 35 of the bell crank 20. The slotted connection of the link 18 with this bell crank 20 permits release of the clutch by the foot pedal lever 17 without moving the latch member 33 out of engagement with the heads of the yokes 8 and 14.

Selector valves of any suitable type are mounted on the steering post 36 of the car adjacent to the steering wheel 37. Air from a suitable source of supply, as for example, a tank 38, is directed by manipulation of these valves to enter any one of the four cylinders. At the same time that one of these valves is operated, or before it is open, the latch bars 33 are released simultaneously with the clutch mechanism by appropriate and sufficient movement of the pedal 17. If for example, air is admitted by such valve through a feed pipe to the cylinder 22, the resultant shifting of the piston 24 and piston rod 26 carries a notch 39 at the end of head 27 into registration with the companion latch 33. If air is admitted to shift the piston 25 inwardly, the latch drops into a notch 40 at the end face of the yoke head 27 and holds it in this position. A spring 41 acting on the bell crank lever 20 holds the latches 33 in operative position. Thus by appropriate manipulation of one of the valves on the steering post any one of the four cylinders may be opened through air or like fluid under pressure and the desired shifting of the change speed mechanism effected.

Spring-pressed plungers 42 and 43 are employed to snap yieldingly into corresponding depressions on the companion yoke heads and center the latter accurately while the heads readily move out of such yielding engagement with the plungers under the impulse of the cylinder charge.

A sliding latch 28, having pointed ends to engage sockets 29 in piston rods 26 and 32, is of such length that when it is in the socket in either rod, the other rod may be moved longitudinally, but by its engagement in the socket, the first rod is prevented from movement until the other rod is in the neutral position with the socket 29 opposite the end of the latch 28. If one pointed end of the latch 28 engages the socket 29 in either rod, and the socket of the other rod is opposite the other end of the latch, as it is when the rods are in neutral position, the first rod may be moved, and, in moving, the cam action of the socket on the pointed end causes the latch 28 to slide into the socket of the other rod, thus locking it in position until the first rod is returned to neutral position. Thus movement of only one rod at a time is possible.

A brake cylinder 44 is in communication with a control valve on the main steering post. A piston 45 therein carries a stem extension 46 that is adapted to underrun a roller 47 on the end of an arm 48 connected to the rock shaft 4. The movement of the arm 48 rocks the shaft 4, which causes the yoke 3 to release the clutch, while the arm 19 also secured to the rock shaft 4 acts through the link 18 to release the latch plates 33 to permit the action of the neutralizing device later to be described. Thus the clutch is thrown out, and the gears shifted to neutral by the operation of the brake cylinder through its connections. The main piston stem 49 from the piston 45 is slotted and engaged by a cross-pin 50 of the brake rod 51, this connection permitting sufficient movement of the piston to cause the release of the clutch and the shifting of the gears to neutral before the brake is operated.

In preferred form, the type of selective valve on the steering post consists of a substantially rectangular casing 52 in which are transversely reciprocable push rods 53 that correspond in number to the speed changing combinations of the associated gearing and are also arranged to control the reverse and brake mechanism. As herein shown such push rods are square in section and are projected inwardly against the influence of springs 54 which are in compression between the inner end of a longitudinal bore in the rod and a stop block 55 with projecting pin or shoulder 56 engaging the side of the casing. A guard pin 57 on each push rod prevents or limits its outward movement.

Each rod manipulates a longitudinally slotted rock arm 58 by means of a pin 59, a roller 60 on the latter reducing frictional engagement. When in normal inoperative position with the companion push rod in initial position, the rock arm 58 holds a valve closure 62 so that a by-pass 63 in the closure connects the particular outlet 64 for the closure in communication with an exhaust chamber and relief opening 65 in the valve casing. When the closure under the influence of the rock arm 58 and the inwardly moved companion push rod 53, is turned in open position, the transverse duct 66 therein connects the outlet 64 of that particular closure with a passage 67 which is directly connected to the fluid pressure supply means through a common intake of the valve casing 52 indicated at 68. An adjusting screw 69 with jam nuts 70 permits the proper seating of each closure, which is herein shown of a tapered plug form, in its seat to produce the necessary close fit without binding. As a further detail of construction, a base plate 71 with holding member 72 is used to give ready access to the interior of the casing.

Compressed air is supplied to the tank 38 by any suitable means, as for example, by an air pump 73, operated by the starter mechanism 74. A conduit 75 leads from the tank 38 to the intake 68 in the valve casing 52, the passage 67 thus being constantly filled with air under pressure. Inward pressure on the push rod 53 farthest to the left in Figs. 7 and 8 will cause the opening of the corresponding closure 62 to allow air to go from the passage 67 to the conduit 76 leading to the brake cylinder 44. The next push rod is shown as controlling the conduit 77 leading to the reversing cylinder 30. The central push rod controls the conduit 78 leading to the direct-drive gear controlling cylinder 22. The second push rod from the right controls the conduit 79 which is connected with the cylinder 23. The push rod at the extreme right controls the conduit 80 which leads to the cylinder 31. A conduit 81 leads from the exhaust port 65 to any convenient point, as beneath the floor of the car.

As before stated, on account of the operation of the sliding latch 28, the rods 26 or 32 may move from the neutral position only one at a time, the other being held by the latch 28. At each end of each of the rods 26 and 32, is a beveled surface 82, arranged to engage the lower end of a gravity actuated valve member 83, shown in Fig. 2 as having a conical surface normally engaging a tapering seat in the lower end of passages 84 communicating with a conduit 85. As the rod 26, or 32 reaches the end of its travel, the valve 83 at that end of the cylinder is lifted, while all three other similar valves are closed.

The conduit 85 is connected with the conduit 75 by means of a valve 86, best shown in Figs. 5 and 6. A valve member 87 mounted for rotation in the bore 88 has at one end a ratchet 89, having four teeth, and at the other end, a four-armed closure 90 which normally lies in the position shown in Fig. 6 with the arms covering four inlets 91, the closure being held tightly over the inlets by means of a spring 92.

A pawl 93 operated by the link 18 is arranged to engage a ratchet tooth to cause rotation of the valve member 87 when the link has moved far enough to operate the bell crank lever 20 to raise the latch members 33. There is enough lost motion to permit operation of the clutch by the lever 17 without moving the ratchet. A full throw of the lever 17 will first release the clutch, then lift the latch plates 33, and then pull the hooked pawl along far enough to give the valve member 87 a quarter turn.

During this quarter revolution, the ports 91 will be opened for an instant and immediately closed. While they are open, compressed air from the conduit 75 will pass through the valve 86 into the conduit 85 and through the open passage 84.

Only one passage 84 can be open at a time, and the compressed air which enters the open passage will move the piston that holds the valve 83 open back to its neutral position. As the piston passes the inlet for the conduit (78 for example) controlling that particular piston, the air will escape through the conduit, which is normally open to the atmosphere as shown in Fig. 12. As the rod 26 or 32 nears the central position, the spring pressed plungers 42 and 43 will engage the depression in the side of the rod and the rod will come to rest in the neutral position. The pedal must be depressed far enough to permit operation of the gear shift and this insures that the neutralizing valve shall open and close.

If no passage 84 is open, and the valves 83 are all in closed position, the rotation of the valve member 87 will not produce any effect upon the pistons.

It is also to be noted that after one of the rods 26 or 32 has been shifted to either end of its travel, it will be held positively in position by the latch plates 33, and any further manipulation of the push rods 53 will produce no movement of either rod. Only after the clutch is released and the valve 86 operated to bring the rods into neutral position, can any of the gear-shifting pistons be operated.

The clutch may be operated without change in the position of the gears, because of the lost motion provided for by the slotted link 18, but no gear shifting can occur while the clutch is in, and the service brake operates only after the clutch is out and the gears in the neutral position.

An emergency brake operated by a foot pedal 94 is indicated in Fig. 1.

Through the medium of a mechanism of this type and the pneumatically operated pistons, the driver of a machine so equipped may make any gear shift he chooses without removing his hands from the steering wheel, and without physical effort. Because of the yielding movement of the pistons, the gears and pinions are not forced abruptly together but are permitted to slide on each other until they come into proper register for further movement, so that they are not liable to be injured even when shifted under emergency conditions.

As a result of this construction the vehicle to which the device is applied may be controlled by the simple manipulation of the air valve without physical exertion on the part of the operator or any necessity of movement of the separate levers and pedals which are common under the ordinary or standard type of manual automobile control. The device is applicable to any type of gear with any number of speed changes and reverse speeds by appropriate disposition of parts and connections.

Obviously, changes in the details of construction may be made without departing from the spirit of my invention and I do not care to limit myself to any particular form or arrangement of parts.

I claim:

1. In an automobile, change speed and reversing transmission mechanism including a clutch, a source of motive fluid, pneumatically operated means adapted to be actuated by the motive fluid for shifting the transmission mechanism into any desired position, said pneumatically operated means including opposed cylinders, a valve in the outer end of each cylinder adapted to be opened to place the end of the cylinder in communication with the source of motive fluid, pistons in said cylinders to effect opening of said valves and shifting of the elements of said transmission mechanism, pneumatic control mechanism, means for locking the pneumatically operated means in adjusted position, and pneumatic means for releasing the clutch adapted to unlock the pneumatically operated means when the clutch is inoperative.

2. In an automobile, a power plant, traction bearing wheels, change speed and reversing transmission mechanism connecting the power plant and traction bearing wheels and operating through a clutch, means for releasing the clutch, pneumatically operated gear-shifting mechanism adapted to move the change speed and reversing transmission mechanism into any desired position, said pneumatically operated means including opposed cylinders, valves in the outer ends of said cylinders adapted to be opened to place an end of one of said cylinders in communication with the atmosphere, pistons in said cylinders to effect opening of said valves and shifting of the elements of said transmission mechanism, means for automatically locking the pneumatic gear shifting mechanism in adjusted position, and means operated by the clutch releasing means for unlocking the pneumatic mechanism.

3. In an automobile, change speed and reverse transmission mechanism operatively connected to a clutch, an operating means for said clutch, a source of supply of fluid under pressure, fluid pressure operated means connected to the change speed and reverse transmission mechanism for shifting the latter to any desired position, said pneumatically operated means including opposed cylinders, a valve in the outer end of each cylinder adapted to be opened to place the end of said cylinder in communication with the source of fluid under pressure, pistons in said cylinders to effect opening of said valves and shifting of the elements of said transmission mechanism, selector means for opening the fluid pressure operated means to the effect of fluid from the supply, and means actuated by said clutch operating means independently of said selector means and adapted to return the change speed and reverse mechanism to initial position.

4. Pneumatic controlling means for setting the power transmission device of an automobile, comprising a source of supply of fluid under pressure, means operatively connected to the power devices and adapted to be shifted by fluid under pressure, said shifting means including opposed cylinders, a valve in the outer end of each cylinder adapted to be opened to place the end of the cylinder in communication with the source of fluid under pressure, pistons in said cylinders to effect opening of said valves and shifting of the elements of said transmission mechanism, means for returning the power devices to initial position, means for locking the power devices against such returning means in adjusted position, and a plurality of independent selector valves for directing fluid under pressure from the source of supply to any one of the power devices, said valves being adapted to release the fluid pressure against a power device when the valves are closed against the supply of fluid under pressure and open to the atmosphere.

5. In an automobile, change speed and reversing transmission mechanism operatively connected with a clutch, reciprocable members adapted to be operated by fluid under pressure and connected to the elements of the change speed and reversing mechanism to set the latter in any desired position, means for locking the reciprocable members in adjusted position, means for operating the clutch adapted by initial movement to release the clutch and by final movement to release the locking means, pneumatically operated means actuated by the final movement of the clutch operating means for returning the reciprocable members with the connected parts to neutral position, and selector valves independent of said pneumatically operated means for admitting fluid under pressure to operate any one of the reciprocable members.

6. In an automobile, change speed and reversing transmission mechanism, a clutch operatively connected thereto, means for releasing the clutch, brake mechanism, members operatively connected to the elements of the change speed and reversing transmission mechanism, fluid under pressure means adapted to shift said members to move the transmission to any desired position, fluid pressure operated means for throwing the brake mechanism into operation, a series of selector valves for introducing fluid under pressure to operate any combination of the transmission mechanism operating elements and the brake devices, means actuated by the brake mechanism for operating the clutch releasing means, and pneumatic mechanism operated by the clutch releasing means for returning the transmission mechanism to neutral position from any position of adjustment.

7. In an automobile, a pneumatically operated controlling system comprising cylinders, pistons reciprocable therein, means for operatively connecting the pistons severally to the elements of the power transmitting devices of an automobile whereby the devices may be set in any position desired, connections between one of the pistons and the braking mechanism of the automobile for operating the brakes, pneumatic means for returning the gear shifting pistons to initial position when released, latches for locking the gear shifting pistons in adjusted position, a source of fluid under pressure, selector valves for directing fluid under pressure into any of the cylinders and means actuated by the braking mechanism for releasing the latches, and for causing the operation of the pneumatic means which return the gear shifting pistons to initial position.

8. In an automobile, having change speed and reversing transmission mechanism operatively connected with a clutch, and brake mechanism, a pneumatically operated control system comprising reciprocable members yieldingly held in initial position and operatively connected to the elements of the transmission mechanism for setting the latter in different speed positions, latching members for securing the reciprocable members in desired position positively, pneumatically operated means cooperating with the reciprocable members whereby the latter move under the influence of fluid under pressure, a source of supply of fluid under pressure, selector valves adapted to introduce fluid under pressure to any of the members of the control system for operating the latter, and means controlled by the clutch mechanism for releasing the latching members, the selector valves being adapted to release the reciprocable parts automatically from the influence of fluid under pressure, when the valves are closed.

9. In an automobile, change speed and reversing mechanism operatively connected to a clutch mechanism, a source of fluid under pressure, fluid pressure chambers, members movably mounted in the chambers and adapted to be operated by fluid under pressure admitted thereto, valves in said chambers actuated by said members to place the ends of said chambers in communication with the source of fluid under pressure, means connecting such members with the several elements of the change speed and reversing transmission mechanism for throwing the latter into any desired position, pneumatically operated means controlled by the clutch mechanism for returning the movable members to initial position, and selector valves adapted to direct fluid under pressure into the chambers to shift the movable members in desired position, said pneumatically operated means being operatable independent of said selector valves.

10. In an automobile, change speed and reversing transmission mechanism operatively connected to a clutch mechanism, brake operating mechanism, pneumatic means for severally shifting the members of the transmission mechanism to any desired position, pneumatic means for operating the brake mechanism, means for locking the transmission shifting pneumatic means in desired position, means for manually releasing the clutch, and selector valves for directing fluid under pressure to the several pneumatically operated means, the brake operating means being adapted to automatically move the clutch releasing mechanism to depressed position while the brakes are being applied, and the clutch releasing mechanism being adapted to unlatch the locking means when moved to initial position.

11. In an automobile, a casing, change speed and reversing transmission mechanism housed therein, a source of motive fluid, a clutch operatively connected to the transmission mechanism, cylinders on the casing, pistons reciprocable in the cylinders and operatively connected to the members of the transmission mechanism for setting the latter in any desired position, automatically operated means for locking the pistons and the associated parts in any desired position, said automatically operated means being released by actuation of said clutch to permit of said pistons being shifted, selector valves adapted to direct motive fluid into the cylinders selectively, and means in said cylinders actuated by said pistons for establishing cylinder communication with the source of motive fluid for piston neutralizing purposes.

12. In an automobile, change speed and reversing transmission mechanism, a clutch operatively connected thereto, brake mechanism, sets of opposed cylinders, a pair of pistons in each set of cylinders, each pair of pistons operatively connected to a change speed and reversing mechanism for shifting the elements of the latter into any desired relation, a cylinder having a piston adapted for moving said brake operating mechanism for moving the latter, means for returning the several shifting pistons into neutral position when released, a latch for securing the shifting pistons in adjusted position, means for releasing the latch, a clutch releasing member operatively connected to the latch whereby the latter may be disengaged when the clutch is released and means operated by the piston connected to the brake operating mechanism for throwing the clutch out of operation when the brake mechanism is operated, and selector valves for admitting fluid under pressure to the several cylinders selectively, said valves being adapted to relieve the pressure in the cylinders after cutting off the fluid under pressure therefrom.

13. In an automobile, change speed and reversing transmission mechanism, a clutch operatively connected thereto, means for releasing the clutch, cylinders provided with pistons operatively connected to the members of the transmission mechanism for shifting the latter into any desired position, means for locking the pistons in selected position, pneumatically operated means for returning the pistons to neutral position, connections between the locking means and the clutch releasing means, whereby the locking means may be thrown out when the clutch is disengaged, selector valves connected with a source of fluid under pressure and adapted to direct the fluid into the cylinders selectively, the valves being adapted to relieve the pressure in the cylinders from which they have cut off the supply of fluid, and a valve actuated by the clutch releasing means adapted to admit fluid under pressure into one of the cylinders for returning a piston to neutral position.

14. In an automobile, change speed and reversing transmission mechanism, means for shifting the elements thereof to obtain any speed and direction of motion desired, within the range of the mechanism, fluid pressure operated means for moving the shifting mechanism into desired position, brake mechanism, fluid pressure operated means for working the brake mechanism, clutch releasing mechanism, means operatable in synchronism with said clutch releasing mechanism for locking the transmission mechanism shifting means in any desired position, means for setting the brakes independently of the shifting means, means operated by the brake mechanism for throwing the clutch into neutral position and thereby releasing the locking means, and means for directing fluid under pressure selectively to the mechanism for shifting the transmission mechanism and for applying the brake mechanism.

15. In an automobile, change speed gearing having members adapted when shifted to change the driving speed and the direction of motion of the mechanism, means operated by fluid under pressure adapted to shift the several members, means adapted to return the several members and associated parts to initial position, means for latching the several parts in desired position, a clutch operatively connected to the transmission mechanism, means for releasing the clutch, connections between the releasing means and the locking means for disengaging the latter, braking mechanism, means operated by fluid under pressure for moving the braking mechanism, and means operated by the brake moving means adapted to shift the clutch releasing means into neutral released position when the brakes are being applied together with means for admitting fluid under pressure to the several means so operated selectively.

16. A structure as in claim 15, in which the means to return the shifting members to initial position is controlled by the clutch releasing means.

17. In an automobile, a gear casing, change speed and reversing transmission mechanism mounted therein, cylinders disposed in pairs on the casing, interconnected pistons in each pair of cylinders, means in each pair of cylinders, for normally holding the pistons centered relatively thereto, members operatively connecting the pistons with the speed changing and reversing members of the transmission mechanism, means for locking the pistons in adjusted position, and valves for admitting fluid under pressure to the several cylinders, adapted to relieve the pressure in any cylinder when the latter is cut off from a fluid supply.

18. A structure as in claim 17, having a clutch operatively connected to the transmission mechanism, a member for releasing the clutch, and connections between the member and the piston locking means adapted to release the latter when the clutch is released.

19. A fluid pressure operated controlling system for setting the change speed and reversing transmission mechanism and operating the brakes of an automobile, comprising in combination with a source of fluid under pressure, chambers adapted to receive such fluid, members movable therein under the influence of the fluid admitted to the chambers and operatively connected to the elements of the change speed and reversing transmission mechanism for shifting the latter to give any desired speed and direction of movement within the range of the mechanism, brake setting means, locking mechanism controlled by said brake setting means for locking the movable members severally in adjusted position, valve controlling means for returning the transmission mechanism to neutral position, and means operated by the brake setting mechanism for releasing the locking mechanism and setting in action said valve controlled means for returning said transmission mechanism to neutral position.

20. In an automobile, a cylinder casing adapted to be secured adjacent to the transmission mechanism of an automobile, a pair of alined cylinders therein, pistons reciprocable in the cylinders, a piston rod coupling the pistons, pneumatically operated means adapted to move the pistons and rods to a normally centered position between the cylinder ends, a member on the piston rods connected to the shifting means of a transmission mechanism, and selector valves for admitting fluid under pressure to either cylinder, provided with a relief port for relieving the pressure in the other cylinder.

21. In a pneumatic control system for a change speed and reversing transmission mechanism, a cylinder casing, pairs of cylinders oppositely disposed therein, pistons for the cylinders, piston rods coupling the pistons of each pair of cylinders to move together, means connected to the rods for operating the change speed and reversing members of the transmission mechanism, latch members on the casing adapted to lock the pistons either in neutral position or at either end of the limit of motion thereof, pneumatically operated means to return the pistons and associated parts to neutral central position when unlocked, means for admitting fluid under pressure selectively to the cylinders and for relieving the cylinders from pressure of fluid, and means for releasing the locking means from the pistons and associated parts.

22. In an automobile, change speed and reversing transmission mechanism, a clutch operatively connected thereto, a pedal for releasing the clutch, a cylinder casing, cylinders in the casing, pistons for the cylinders, connections between the pistons and the change speed and reversing members of a transmission mechanism for setting the latter in any desired position, pneumatically operated means to return the pistons to initial neutral position, and means connected with the clutch release pedal adapted to actuate the means for returning the pistons to initial position when the clutch is out.

23. The combination in an automobile with a change speed and reversing transmission mechanism, a casing housing the latter, a clutch operatively connected to the transmission mechanism, and manually operable means for releasing the clutch, of a cylinder casing secured on the transmission casing, cylinders arranged in the casing, pistons reciprocable in the casing, means connecting the pistons each with a member of the change speed and reversing transmission mechanism, pneumatically operated means for returning the pistons to neutral position, and connections between the clutch releasing mechanism and the piston returning means for actuating the latter while the clutch is being thrown out.

24. In an automobile, a change speed and reversing transmission mechanism, a clutch operatively connected thereto, brake operating mechanism, cylinders disposed in operative relation to the mechanisms, pistons reciprocable in the several cylinders, means operatively connecting one of the pistons with the brake operating mechanism, means connecting the other pistons each with a member of the change speed and reversing transmission mechanism, means for returning the transmission mechanism pistons to initial position, means for releasing the clutch, connections between the releasing means and piston returning means for actuating the latter while the clutch is being thrown out, and a reciprocable member carried by the brake mechanism piston adapted to shift the clutch operating member to released position when the piston operates the brake mechanism.

25. In an automobile, change speed and reversing transmission mechanism, a clutch operatively connected thereto, brake mechanism, cylinders, pistons reciprocable therein, means connecting one of the pistons with the brake mechanism to operate the latter, means connecting the other pistons severally to the change speed and reversing transmission mechanism for moving the latter into any desired position, means for releasing the clutch, means operated by the brake piston adapted to move the clutch release member to throw out position when the brakes are operated, selector valves, a source of fluid supply and conduits between the source of fluid supply and the several cylinders controlled by the selector valves for admitting fluid under pressure to the several cylinders and for relieving the pressure in the inoperative cylinders, and a valve operated by the clutch releasing means for admitting fluid under pressure to the several cylinders to return the pistons of the change speed and reversing mechanism to initial position.

26. In a fluid pressure operated controlling system for shifting the change speed and reversing transmission mechanism and operating the brake system of automobiles, fluid pressure operated means for selectively moving and setting the members of the transmission mechanism and for operating the brake mechanism, a source of supply of fluid under pressure, conduits connecting the source of supply with the several operating means, a series of selector valves controlling the conduits and admitting fluid to the desired parts, adapted also to release pressure of fluid in the parts that are not in operation, a neutralizing valve associated with said fluid pressure operated means, operatable independent of said selector valves and in advance of a fluid pressure operation of said brake mechanism.

27. In a fluid pressure operated controlling system for shifting the change speed and reversing transmission mechanism and operating the brake system of automobiles, fluid pressure operated means for selectively moving and setting the members of the transmission and for operating the brake mechanism, a source of supply of fluid under pressure, conduits connecting the source of supply with the several operating means, and a plurality of independent selector valves controlling the conduits and consisting of a casing having a single intake chamber adapted to be connected with the source of supply and a single release chamber, closures in the casing adapted to connect the inlet chamber with an outlet in communication with one of the operating means, when turned in one position, and to throw the relief chamber into connection with such operating means when the valve closure is in shut off position, a push rod for each closure reciprocable in the casing, means coupling the closure to the push rod to shift the closure when the push rod is projected, and spring means for returning the closure and push rod to initial position.

28. In a pneumatic control system for the purposes specified, including a source of supply of fluid under pressure and fluid pressure operated means, a plurality of independent selector valves comprising a casing, closures therein each adapted to connect a common intake with an individual outlet when in open position and the individual outlet with a common exhaust relief chamber, when in initial position, a push rod reciprocable in the casing for each closure, a rock arm for each closure articulated to the push rod for shifting the closure, spring members for normally maintaining the push rods and closures in initial position, a conduit connecting the source of supply with the common intake of the casing, and conduits connecting the individual outlets with the several fluid pressure operated means.

29. In a fluid pressure operated controlling system for the purposes described, including fluid pressure operated means for gear shifting and brake setting, and a source of supply of fluid under pressure, a plurality of independent selector valves comprising a casing, closures oscillatory therein each adapted, when in initial position, to connect an individual outlet with a common exhaust relief chamber, and, when turned, to connect the individual outlet with a common intake, a forked rock arm connected to each closure, a longitudinally reciprocable, non-rotatable push rod in the casing for each closure articulated to the companion rock arm, a stop block reciprocable in the bore of each push rod and in abutment with a side of the casing, and a spring in compression between the stop block and the push rod adapted to normally hold the push rod and associated closure in initial closed position.

30. In an automobile, change speed and reversing transmission mechanism, a casing therefor, a clutch operatively connected thereto, manually operable means for releasing the clutch, brake mechanism, cylinders mounted adjacent the casing and brake mechanism, pistons reciprocable in the casing, means coupling one of the pistons with the brake mechanism for operating the latter, means carried by the brake operating means adapted to shift the clutch releasing mechanism to throw out position when the brakes are applied, members each operated by a piston and connected to a gear shifting member of the transmission mechanism, means normally holding the pistons and associated members in initial neutral position, means for positively locking the pistons and associated members in neutral position and in projected position, means connected to the clutch operating member and adapted to release the locking means of the pistons, a source of fluid under pressure, a plurality of independent selector valves having a common inlet connected to the source of fluid supply, conduits connecting individual outlets of the selector valves with the several cylinders, and means in the selector valves adapted when in closed initial position, to connect the cylinders with a release exhaust chamber in each valve and when in open position to connect the respective cylinders with the valve inlet.

31. In an automobile, change speed and reversing transmission mechanism, a casing therefor, a clutch operatively connected thereto, manually operable means for releasing the clutch, brake mechanism, cylinders mounted adjacent the casing and brake mechanism, pistons reciprocable in the casing, means coupling one of the pistons with the brake mechanism for operating the latter, means carried by the piston brake operating means adapted to shift the clutch releasing mechanism to throw out position when the brakes are applied, members each operated by a piston and connected to a gear shifting member of the transmission mechanism, means normally holding the pistons and associated members in initial neutral position, means for positively locking the pistons and associated members in neutral position and in projected position, means connected to the clutch operating member adapted to release the locking means from the pistons, a source of fluid under pressure, a plurality of independent selector valves having a common inlet connected to the source of fluid supply, conduits connecting individual outlets of the selector valves with the several cylinders, means in the selector valves adapted when in closed initial position to connect the conduits with release exhaust chambers in the valves and when in open position to connect the respective conduits with the valve inlet and spring means in the valves for normally maintaining the several members thereof in initial closed position.

32. In a gear shifting mechanism for an automobile, a casing, shiftable change speed and reversing gears in said casing, cylinders on said casing disposed in pairs with the cylinders of each pair in opposed relation, the cylinders of each pair having intermediate ports and end ports, check valves for the end ports of said cylinders, articulated pistons in the cylinders of each pair and adapted for shifting gears in said casing, said pistons being disposed to cover and uncover said intermediate ports, means carried by said pistons for opening said check valves, yieldable means carried by said cylinders to engage said pistons and hold said pistons in a central position relative to the cylinders of each pair, means for locking said pistons in such central position and other positions to which said pistons may be shifted, and a controlled source of air under pressure for shifting said pistons in said cylinder.

33. In a gear shifting mechanism for an automobile, opposed cylinders provided with intermediate ports and end ports, pistons in said cylinders adapted to cover and uncover said intermediate ports, check valves for the end ports of said cylinders adapted to be opened by said pistons, a head connecting the pistons of opposed cylinders and adapted for shifting gears, laterally shiftable detents adapted to engage said head and hold said head in a central position relative to said opposed cylinders, locking means adapted to engage said head and hold it in other positions than that of a central position, and a controlled source of motive fluid for moving said pistons for gear shifting purposes.

In testimony whereof I affix my signature in the presence of two witnesses.

LAWRENCE S. NASH.

Witnesses:
ANNA M. DORR,
O. F. BARTHEL.